United States Patent Office 2,841,584
Patented July 1, 1958

2,841,584

HEXAHYDROPYRIDAZINE, DERIVATIVES THEREOF, AND PROCESS

William T. Hunter, Minneapolis, Minn., assignor to Sterling Drug Inc., New York, N. Y., a corporation of Delaware No Drawing. Application December 14, 1954
Serial No. 475,279

11 Claims. (Cl. 260—250)

This invention relates to compounds having the formula

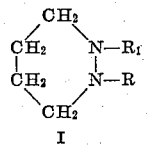

I wherein R and R' represent hydrogen atoms or carbo-lower-alkoxy groups. In these compounds, where R or R' is hydrogen, the nitrogen atom linked thereto is basic and forms acid-addition salts. Where R and R' is a carbo-lower-alkoxy group the nitrogen atom is not basic and forms no acid-addition salts. Thus, the invention also relates to acid-addition salts of the compounds of Formula I wherein at least one of R and R' is hydrogen. The invention also relates to processes for the preparation of these new compounds.

The compound of the above Formula I where R and R' are both hydrogen is hexahydropyridazine. Hexahydropyridazine and its acid-addition salts are amebacides. The testing procedure which was used for determining ambacidal activity is described by Dennis, Berberian and Hansen, Amer. J. Trop. Med., 29, 683 (1949). The other compounds within the scope of the above Formula I wherein one or both of R and R' are carbo-lower-alkoxy groups are useful as starting materials in the preparation of hexahydropyridazine, said preparation being effected by hydrolysis and decarboxylation reactions as described below.

The compounds of the invention are prepared by the chemical transformations outlined on the following flow-sheet.

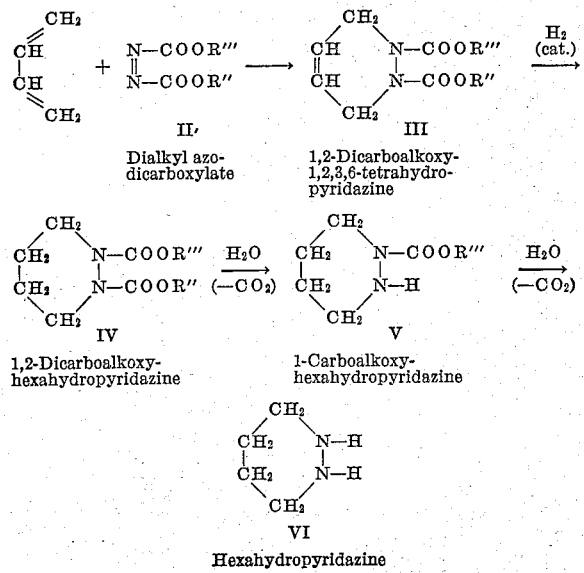

Butadiene is reacted with a dialkyl azodicarboxylate (II) according to the Diels-Alder reaction to give a 1,2-di-(carbo-lower-alkoxy)-1,2,3,6-tetrahydropyridazine (III). The latter is catalytically hydrogenated to produce a 1,2-di-(carbo-lower-alkoxy)hexahydropyridazine (IV). Any catalyst adapted to the hydrogenation of ethylenic double bonds can be used, including palladium, nickel and platinum catalysts. The carboalkoxy groups of compound IV can be removed selectively by hydrolysis and decarboxylation in the presence of a strong base, preferably also in the presence of an organic solvent inert to basic reagents, such as lower-alkanols, lower-aliphatic ketones, dioxane and the like; ethyl alcohol is a preferred solvent. The preferred strong bases are the alkali metal hydroxides such as sodium hydroxide and potassium hydroxide. The reaction proceeds stepwise, one carboalkoxy group being hydrolyzed and decarboxylated to a considerable extent before the second carboalkoxy group is attacked. Accordingly, the intermediate mono-carboalkoxy-hexahydropyridazine (V) can be isolated if the hydrolysis mixture is heated for a limited time, or a limited amount of base is used. The optimum conditions for formation of V can best be determined by measuring the amount of alkali metal carbonate which precipitates from the reaction mixture and determining the point at which one molar equivalent of alkali metal carbonate has formed. At this point the reaction mixture contains some unreacted IV as well as some completely hydrolyzed and decarboxylated product VI. Mixtures of IV, V and VI can be readily separated by taking advantage of their differences in chemical and physical properties. IV is neutral and therefore insoluble in aqueous acid. V is basic and soluble in dilute acid but insoluble in water and dilute base. VI is basic but soluble in water. Therefore, the IV can be separated by organic solvent extraction of the initial product mixture in aqueous acid. The remaining V and VI can be separated making the aqueous acid solution basic and extracting with an organic solvent. The V is extracted but the VI, which is highly water-soluble, is not.

Hydrolysis and decarboxylation of IV can also be effected by heating with an aqueous mineral acid, e. g., hydrochloric, sulfuric or phosphoric acids.

Hexahydropyridazine (VI) is formed by exhaustive hydrolysis and decarboxylation of compounds IV or V. In the case of basic hydrolysis the degree of completion of the reaction can be determined by measuring the amount of alkali metal carbonate precipitated from the reaction mixture.

In the above Formulas II–V, inclusive, the groups R'' and R''' represent lower-alkyl groups, which can be the same or different, having from one to about six carbon atoms, thus including such groups as methyl, ethyl, propyl, isopropyl, butyl, isobutyl, secondary-butyl, tertiary-butyl, pentyl, isopentyl, hexyl, isohexyl, and the like.

The compounds of Formulas V and VI can be obtained and utilized in the form of acid-addition salts and these salts are within the purview of the invention. The acids which can be used to prepare acid-addition salts are preferably those with produce when combined with the free base, salts whose anions are relatively innocuous to animal organisms in therapeutic doses of the salts, so that the beneficial physiological properties inherent in the free base are not vitiated by side effects ascribable to the anions. Appropriate acid-addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid, and the like, giving the hydrochloride, hydrobromide, hydriodide, nitrate, phosphate or acid phosphate, sulfate or bisulfate, acetate, citrate or acid citrate, tartrate or bitartrate, and lactate salts, respectively. Hexahydropyridazine, having two basic nitrogen atoms can react with either one or two moles of acid to form either mono- or di-acid-addition salts, depending upon the amount and concentration of acid present and the conditions under which salt-formation is effected.

The following examples are illustrative of the invention, but the latter is not limited thereby.

EXAMPLE 1

(a) 1,2-dicarbethoxy-1,2,3,6-tetrahydropyridazine

A mixture of 44 g. (0.81 mole) of 1,3-butadiene and 141 g. (0.81 mole) of diethyl azodicarboxylate in 500 cc. of absolute ether was allowed to stand at 25–30° C. for about thirty-six hours, using a water bath initially to control the temperature of the slightly exothermic reaction. The reaction mixture was distilled and the fraction boiling at 109–127° C. (0.55 mm.) was collected, giving 124 g. of 1,2-dicarbethoxy-1,2,3,6-tetrahydropyridazine, $n_D^{25}=1.4704$.

Analysis.—Calcd. for $C_{10}H_{16}N_2O_4$: C, 52.61; H, 7.07; N, 12.28. Found: C, 52.50; H, 7.16; N, 12.26.

According to the manipulative procedure described above, butadiene can be reacted with dimethyl azodicarboxylate, diisopropyl azodicarboxylate, dibutyl azodicarboxylate or dihexyl azodicarboxylate to give 1,2-dicarbomethoxy-1,2,3,6-tetrahydropyridazine, 1,2 - dicarboisopropoxy-1,2,3,6-tetrahydropyridazine, 1,2-dicarbobutoxy-1,2,3,6-tetrahydropyridazine or 1,2-dicarbohexoxy-1,2,3,6-tetrahydropyridazine, respectively.

(b) 1,2-dicarbethoxyhexahydropyridazine

A solution of 20 g. of 1,2-dicarbethoxy-1,2,3,6-tetrahydropyridazine in 150 cc. of absolute ethanol was shaken in a hydrogen atmosphere in the presence of 0.2 g. of platinum oxide catalyst at an initial pressure of 40 lbs. per sq. inch. After about four hours the catalyst was removed by filtration and fresh catalyst was added and the reduction continued. After one and one-half hours reduction was complete, the reaction mixture was filtered, and the filtrate was concentrated and distilled. The product distilled at about 104–109° C. (0.25 mm.), giving 17.8 g. of 1,2-dicarbethoxyhexahydropyridazine, $n_D^{25}=1.4610$.

According to the manipulative procedure described above, 1,2-dicarbomethoxy-1,2,3,6-tetrahydropyridazine, 1,2-dicarboisopropoxy-1,2,3,6-tetrahydropyridazine, 1,2-dicarbobutoxy-1,2,3,6-tetrahydropyridazine or 1,2-dicarbohexoxy-1,2,3,6-tetrahydropyridazine can be reduced to 1,2-dicarbomethoxyhexahydropyridazine, 1,2-dicarboisopropoxyhexahydropyridazine, 1,2-dicarbobutoxyhexahydropyridazine or 1,2-dicarbohexoxyhexahydropyridazine, respectively.

EXAMPLE 2

1,2-dicarbethoxyhexahydropyridazine

A solution of 20 g. of 1,2-dicarbethoxy-1,2,3,6-tetrahydropyridazine in 180 cc. of absolute ethanol was hydrogenated in the presence of Raney nickel catalyst at room temperature and an initial hydrogen pressure of 100 lbs. per sq. inch. After thirty minutes reduction was complete, the reaction mixture was filtered, the filtrate concentrated in vacuo and the residue distilled. The fraction boiling at 119–121.5° C. (1.4 mm.) was collected, giving 16.1 g. of 1,2-dicarbethoxyhexahydropyridazine, $n_D=1.4610$.

EXAMPLE 3

1-carbethoxyhexahydropyridazine hydrochloride

A mixture of 5 g. of 1,2-dicarbethoxyhexahydropyridazine, 10 cc. of 25% aqueous potassium hydroxide solution and about 3 cc. of 95% ethanol was refluxed for twenty-four hours. The reaction mixture was cooled, acidified with dilute hydrochloric acid, and the acid solution was extracted with ether. The ether removed about 2 g. of starting material which had not been hydrolyzed. The aqueous acid layer was made strongly alkaline with sodium hydroxide solution and extracted with ether. The ether solution was dried over anhydrous sodium sulfate, concentrated, and the residue was treated with an ether solution of hydrogen chloride. The solid material which separated was recrystallized from ethyl acetate, giving 1-carbethoxyhexahydropyridazine hydrochloride, M. P. 146–150° C. A sample of the compound when recrystallized from absolute ethanol and dried for two and one-half hours at 80° C. (1 mm.) had the M. P. 149.5–151.5° C. (corr.).

Analysis.—Calcd. for $C_7H_{14}N_2O_2.HCl$: C, 43.18; H, 7.77; Cl, 18.21. Found: C, 43.33; H, 7.59; Cl, 1830.

EXAMPLE 4

To a solution of 680 g. (2.95 moles) of 1,2-dicarbethoxyhexahydropyridazine in 1 l. of absolute alcohol was added in a fine steady stream with stirring a solution of 461 g. (7.1 moles) of 86.5% potassium hydroxide in 2.5 l. of absolute alcohol. The mixture was refluxed for four hours, cooled, and the solid potassium carbonate removed by filtration. The filtrate was treated with 450 ml. of concentrated hydrochloric acid and both water and alcohol were removed by heating in vacuo. The residual oil was partitioned between water and ether, the layers were separated, and the water layer extracted twice with ether. Evaporation of the ether solutions after drying over anhydrous sodium sulfate gave 93.5 g. (14%) of unchanged 1,2-dicarbethoxyhexahydropyridazine.

The water layer was made strongly basic with 35% sodium hydroxide, the mixture was extracted four times with ether, and the extracts washed twice with saturated sodium chloride solution. The ether solution was dried over anhydrous sodium sulfate and concentrated, yielding an oil which was distilled. 1-carbethoxyhexahydropyridazine, 208 g. (44%), was collected as the fraction boiling at 114–119° C. (20 mm.), $n_D^{25}=1.4700$.

The basic water layer was acidified strongly with concentrated hydrochloric acid, evaporated to dryness, and the residue extracted with isopropanol until nothing further was extracted. Concentration and cooling of the isopropanol extracts gave 115.3 g. (32%) of hexahydropyridazine monohydrochloride, M. P. 164–168° C.

EXAMPLE 5

1-carbethoxyhexahydropyridazine hydrochloride

A mixture of 5.2 g. of 1,2-dicarbethoxyhexahydropyridazine, 10 cc. of concentrated sulfuric acid and 5 cc. of water was heated on a steam bath for twenty-four hours. The reaction mixture was cooled, ice was added and the solution was made alkaline with 50% potassium hydroxide solution. The inorganic material which separated was removed by filtration, the filtrate was extracted with ether and the ether was concentrated giving about 2 g. of residual basic oil. The residue was treated with an ether solution of hydrogen chloride, and the gum which separated was recrystallized from ethyl acetate, giving 1-carbethoxyhexahydropyridazine hydrochloride, M. P. 142–146° C.

According to the manipulative procedures described above in Examples 3, 4 and 5, 1,2-dicarbomethoxyhexahydropyridazine, 1,2-dicarboisopropoxyhexahydropyridazine, 1,2-dicarbobutoxyhexahydropyridazine or 1,2-dicarbohexoxyhexahydropyridazine can be selectively hydrolyzed and decarboxylated to give 1-carbomethoxyhexahydropyridazine, 1-carboisopropoxyhexahydropyridazine, 1-carbobutoxyhexahydropyridazine or 1-carbohexoxyhexahydropyridazine, respectively.

EXAMPLE 6

Hexahydropyridazine hydrochloride

A solution of 330 g. (5.9 mole) of potassium hydroxide in 330 cc. of water was added to a solution of 220 g. (0.96 mole) of 1,2-dicarbethoxyhexahydropyridazine in 2500 cc. of absolute ethanol, and the reaction mixture was refluxed for twenty-four hours. The reaction mixture was cooled and the potassium carbonate which had separated was removed by filtration. The filtrate was refluxed for an additional twenty-four hours, then cooled and acidified with 180 cc. of concentrated hydrochloric acid. The alcohol was removed by distillation in vacuo and the residue was extracted with about 300 cc. of hot isopropyl alcohol. Upon cooling there separated from the isopropyl alcohol solution about 80.5 g. of hexahydropyridazine hydrochloride, M. P. 164–168° C. A sample when recrystallized from isopropyl alcohol had the M. P. 167–169° C. (corr.).

Analysis.—Calcd. for $C_4H_{10}N_2 \cdot HCl$: C, 39.30; H, 9.05; Cl, 28.92. Found: C, 39.38; H, 9.25; Cl, 29.10.

A solution of 12.3 g. of hexahydropyridazine hydrochloride in 50 cc. of methanol was treated with 5 g. of sodium hydroxide. After three hours the reaction mixture was filtered, the alcohol was removed by distillation and the residue distilled, giving 5.6 g. of hexahydropyridazine, B. P. 85–88° C. (88 mm.), $n_D^{25}=1.4772$.

By the manipulative procedure just described, hexahydropyridazine can also be obtained by hydrolysis and decarboxylation of 1,2-dicarbomethoxyhexahydropyridazine, 1,2-dicarboisopropoxyhexahydropyridazine, 1,2-dicarbobutoxyhexahydropyridazine or 1,2-dicarbohexoxyhexahydropyridazine.

Hexahydropyridazine hydrochloride was found to have amebacidal activity in vivo in the hamster at 25–100 mg./kg. dose levels when tested by the method of Dennis, Berberian and Hansen, loc. cit. Doses of 50 and 100 mg./kg. cleared 100% of the animals and doses of 25 mg./kg. cleared 67% of the animals.

What is claimed is:

1. A composition selected from the group consisting of: (a) hexahydropyridazine; and (b) acid-addition salts thereof, said salts having anions which do not substantially increase the toxicity of the compound toward animal organisms.

2. A composition selected from the group consisting of: (a) 1-carbo-lower-alkoxyhexahydropyridazines; and (b) acid-addition salts thereof, said salts having anions which do not substantially incease the toxicity of the compound toward animal organisms.

3. 1,2-dicarbo-lower-alkoxyhexahydropyridazines.

4. 1-carbethoxyhexahydropyridazine.

5. 1,2-dicarbethoxyhexahydropyridazine.

6. An acid-addition salt of hexahydropyridazine, the anion of which does not substantially increase the toxicity of the compound toward animal organisms.

7. Hexahydropyridazine hydrochloride.

8. The process for the preparation of a 1,2-di-carbo-lower-alkoxyhexahydropyridazine which comprises catalytically hydrogenating a 1,2-di-carbo-lower-alkoxy-1,2,3,6-tetrahydropyridazine.

9. The process for the preparation of hexahydropyridazine which comprises hydrolyzing a compound selected from the group consisting of 1-carbo-lower-alkoxyhexahydropyridazines and 1,1-di-carbo-lower-alkoxyhexahydropyridazines in the presence of a member of the class consisting of a strong base and a strong acid.

10. The process according to claim 9 in which the compound hydrolyzed is 1,2-dicarbethoxyhexahydropyridazine and the reaction is carried out in the presence of a strong base.

11. The process for the preparation of hexahydropyridazine which comprises catalytically hydrogenating a 1,2-di-carbo-lower-alkoxy-1,2,3,6-tetrahydropyridazine, and hydrolyzing and decarboxylating the resulting 1,2-di-carbo-lower-alkoxyhexahydropyridazine by heating in the presence of a member of the group consisting of a strong base and a strong acid.

References Cited in the file of this patent

Dennis et al.: Amer. J. Trop. Med., 29, 683–689 (1949).

UNITED STATES PATENT OFFICE
Certificate of Correction

Patent No. 2,841,584                                        July 1, 1958

William T. Hunter

It is hereby certified that error appears in the printed specification of the above numbered patent requiring correction and that the said Letters Patent should read as corrected below.

Column 1, lines 17 to 21, inclusive, the formula should appear as shown below instead of as in the patent—

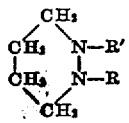

line 27, for "R and R'" read —R or R'—; line 38, for "ambacidal" read —amebacidal—; column 4, line 14, for "Cl, 1830." read —Cl, 18.30.—; column 6, line 20, for "1,1-di-" read —1,2-di-—.

Signed and sealed this 14th day of October 1958.

[SEAL]

Attest:
KARL H. AXLINE
Attesting Officer.

ROBERT C. WATSON,
Commissioner of Patents.